O. C. HOUGHTON.
COTTON HARVESTER, CRUSHER, AND HULLER.
APPLICATION FILED MAY 9, 1910.

985,036.

Patented Feb. 21, 1911.

Witnesses:
C. B. Knudsen
A. G. Peterson

Inventor:
Orley C. Houghton,
By Michael J. Stark & Sons,
Attorneys.

O. C. HOUGHTON.
COTTON HARVESTER, CRUSHER, AND HULLER.
APPLICATION FILED MAY 9, 1910.

985,036.

Patented Feb. 21, 1911.
9 SHEETS—SHEET 4.

Witnesses:
C. B. Knudsen
A. B. Peterson

Inventor:
Orley C. Houghton,
By Michael J. Stark & Sons,
Attorneys.

O. C. HOUGHTON.
COTTON HARVESTER, CRUSHER, AND HULLER.
APPLICATION FILED MAY 9, 1910.

985,036.

Patented Feb. 21, 1911.
9 SHEETS—SHEET 5.

Witnesses:
C. B. Knudsen
A. G. Peterson

Inventor:
Orley C. Houghton,
By Michael J. Stark & Sons
Attorneys.

UNITED STATES PATENT OFFICE.

ORLEY C. HOUGHTON, OF CHICAGO, ILLINOIS, ASSIGNOR TO HENRY E. BULLOCK AND JAMES E. BULLOCK, OF CHICAGO, ILLINOIS.

COTTON HARVESTER, CRUSHER, AND HULLER.

985,036.

Specification of Letters Patent. Patented Feb. 21, 1911.

Application filed May 9, 1910. Serial No. 560,216.

*To all whom it may concern:*

Be it known that I, ORLEY C. HOUGHTON, a citizen of the United States, and resident of Chicago, in the county of Cook and State of Illinois, have invented certain new and useful Improvements in Cotton Harvesters, Crushers, and Hullers; and I do hereby declare that the following description of my said invention, taken in connection with the accompanying sheets of drawings, forms a full, clear, and exact specification, which will enable others skilled in the art to which it appertains to make and use the same.

This invention has general reference to improvements in cotton harvesters; and it consists, essentially, in the novel and peculiar combination of parts and details of construction as hereinafter first fully set forth and described and then pointed out in the claims.

In the drawings already referred to, which serve to illustrate this invention more fully,
Fig. 7 is a similar view of the left-hand side of the machine-body, the gear-wheels being removed to fully disclose the bearings for the various shafts, a portion of the fan casing H' being shown cut away to enable the location of Fig. 8 in proper relative position to the same device shown in Fig. 7.
Fig. 8 is a sectional plan on line 4, 4, of Fig. 7, of one of the bearing members.

Like parts are designated by corresponding symbols and characters of reference in all the various figures.

The object of this invention is the production of a cotton harvester that shall be especially efficient, serviceable, and economical in harvesting what is generally known as the second picking, which usually consists in gathering scattered cotton lint, partly opened, and unripe bolls from the limbs and branches of cotton plants after the leaves thereof have dropped. This picking has heretofore been mostly done by hand labor, and it is, therefore, rather expensive, especially so in view of the fact that labor in the cotton-producing belt of the United States is scarce.

My present machine comprises a machine-body mounted on wheels; gathering mechanism located at the forward end of said machine-body; gearing operated by the traction wheel and adapted to operate the gathering mechanism, the beater; adapted to break up limbs and branches of the cotton plants entering said machine-body; a crushing mechanism adapted to disintegrate the cotton plant portions that enter the machine-body; separating-mechanism adapted to separate the cotton lint from the disintegrated portions of cotton plants; means adapted to convey the separated cotton lint to a receptacle adapted to receive the same; the machine-body with its appurtenants being adapted to be propelled by a team of horses traveling between adjacent rows of cotton plants while the machine moves over a row of these plants. This machine-body is a substantially rectangular structure comprising lower longitudinal angle-bars 11, 12, and upper longitudinal angle-bars 13, 14, respectively. These angle-bars are connected by vertical angle-bars 15, 16, at the forward end of the machine-body, and angle-bars 17, 18, located near the rear end thereof, while further, inclined bars 19, 20, connect the upper and lower angle-bars in the rear of the machine-body. These lower angle-bars 11, 12, extend rearwardly for some distance, and they carry a platform 21, on which there is located a basket 22, in which the gathered cotton lint is deposited, as will hereinafter more fully appear.

The sides of the machine-body are closed by plates 23, 24, preferably of sheet metal, to which the various bearings hereinafter to be described are attached.

The machine-body is mounted upon a fixed, cranked axle 25, which axle is held in brackets 26 fastened to the horizontal limbs of the lower angle-bars, and prevented from rotating by set-screws 27, in said brackets 26. Near the outer ends of this cranked axle 25 are located, and rotatable thereon, a traction-wheel 28, and a smaller grain-wheel 29, the traction-wheel being of sufficient diameter to possess the necessary power to operate the mechanism of the machine, the axle being cranked to bring the same below the machine-body, and the grain-wheel being smaller than the traction-wheel to compensate for the crank in the axle 25. These two wheels have roller-bearings in their hubs, marked 118 in Fig. 3, to reduce friction to a minimum.

Figure 1:
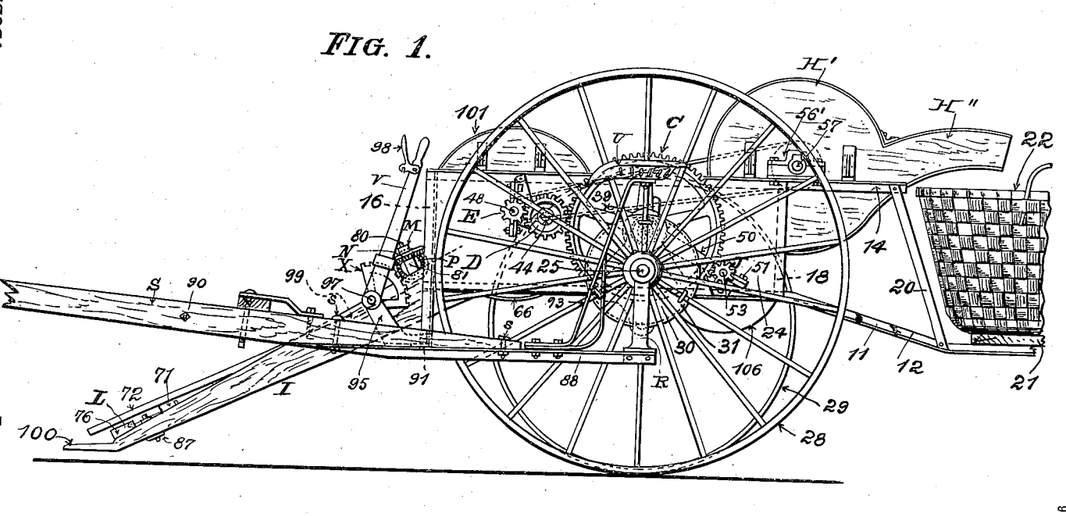
Figure 1 is a side elevation of my improved cotton harvester.
Figure 3:
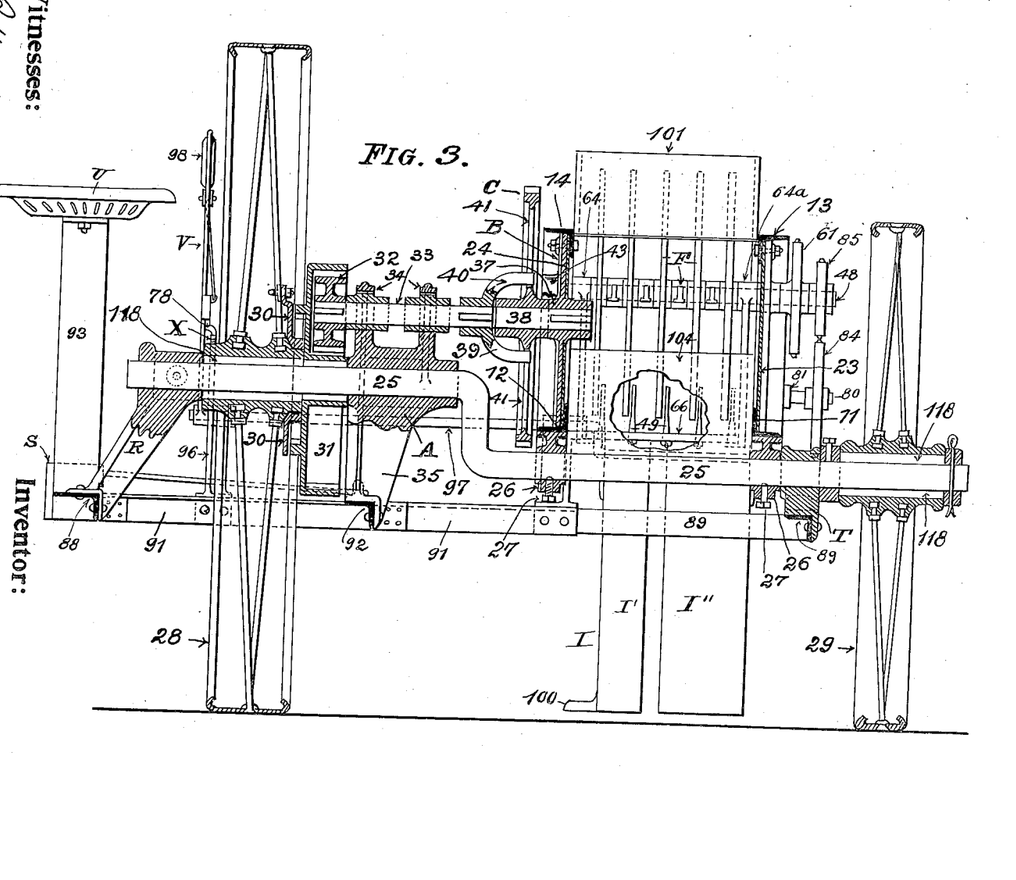
Fig. 3 is a transverse sectional elevation on line 1, 1, of Fig. 2, looking forward of the machine, a portion of one of the inner vertical walls being broken away to show the location of the breaker-bars in connection with the beaters.

To the traction-wheel 28 there is secured a clutch-disk 30, Figs. 1, and 3, the construction of which is analagous to the one shown and described in my Letters Patent No. 955,594, granted April 19, 1910, for cotton harvesters, to which I refer for details of construction, said clutch-disk and the dogs thereon engaging an internal gear-wheel 31, loosely located upon the axle 25 and engaging a pinion 32, located on a shaft 33, which shaft is journaled in bearings 34, formed on the brackets A, located on the axle 25 and having a downwardly-projecting arm 35, the object of which will hereinafter appear.

Figures 4, 5:
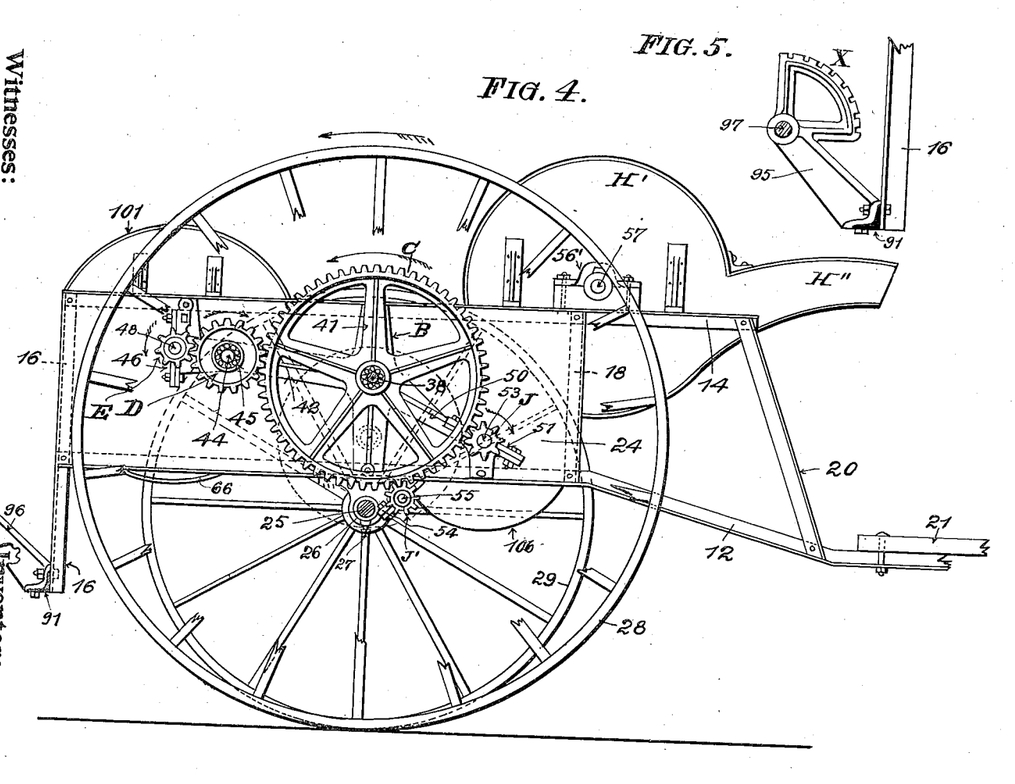
Fig. 4 is a side elevation of the machine-body, the driving wheel having portions of its spokes broken away and the driving clutch and the internal driving gear wheel and its pinion removed to fully show the machine-gearing, located on the left-hand side of the machine-body.
Fig. 5 is a side elevation of one of the brackets for the rocking shaft and the quadrant thereon, the figure being drawn on the line 2, 2, of Fig. 2.
Figure 6:
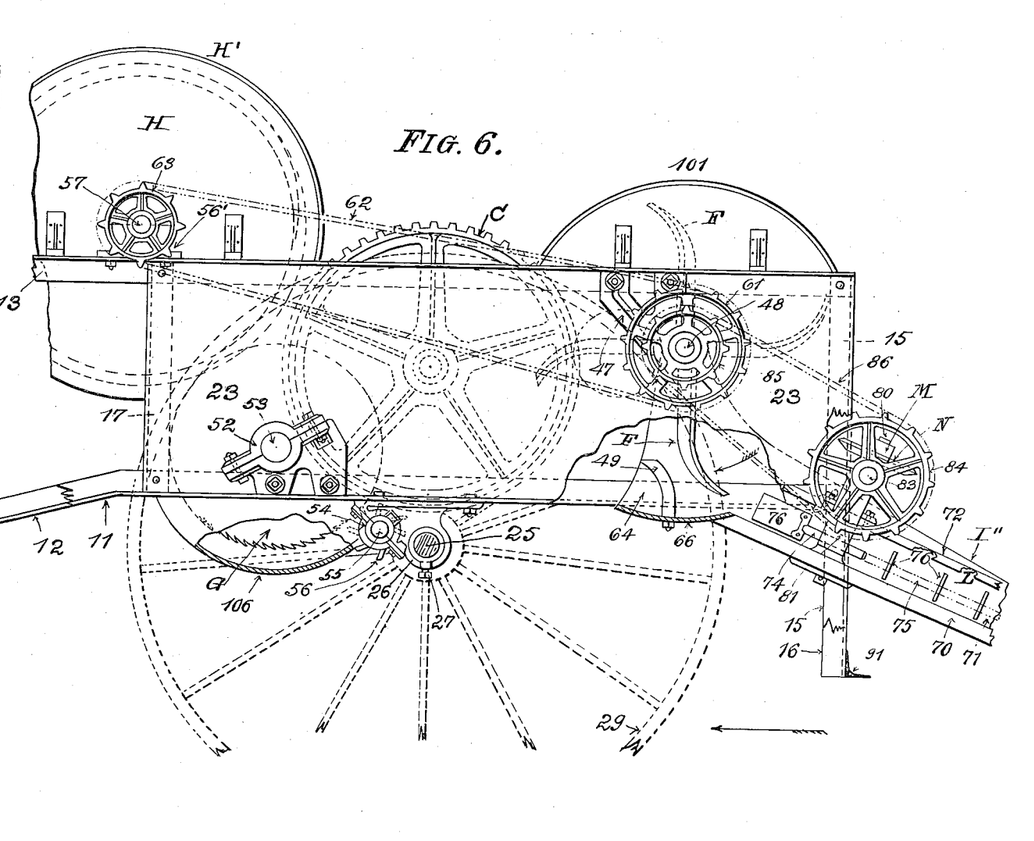
Fig. 6 is a side elevation of the machine-body showing the gearing located on the right-hand side of the machine-body, the grain-wheel located on this side of said machine-body being shown in dotted lines in preference to solid lines, so as not to obscure the parts lying behind the same.
Figures 7, 8:
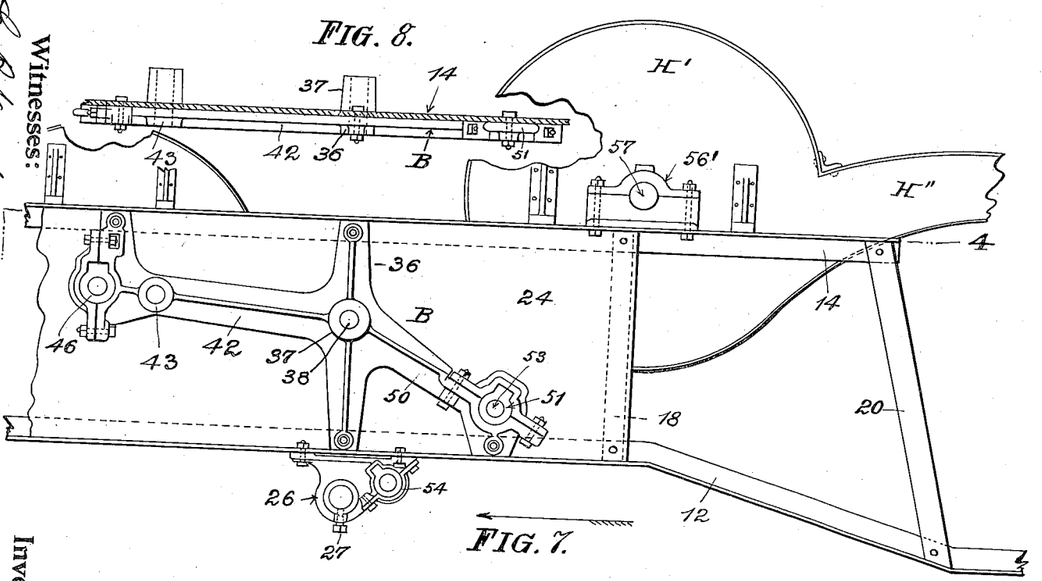
Figure 9:
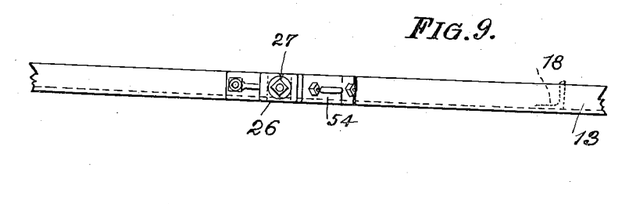
Fig. 9 is an inverted plan of one of the lower angle bars and the bracket for the vehicle axle, and one of the bearings for the crusher shaft located thereon.

On the wall 24 of the machine-body there is placed a peculiarly-shaped casting B, shown in detail in Fig. 7, and comprising a vertical member 36, which has approximately in its center a boss 37, in which there is affixed a stud-shaft 38, which latter shaft is in axial line with the shaft 33, but independent thereof, the reason for making these shafts independent of each other being the difficulty of keeping them in exact alinement. Upon this stud-shaft 38 revolves a spur-gear wheel C, which is rotated with the shaft 33 by a clutch 39, fastened to said shaft 33, and engaging the spokes 41 of said gear-wheel C, by its prongs 40. The member B on the wall 24 has, furthermore, a forwardly and upwardly extending bar 42, on which there is a boss 43, in which is fastened a stud-shaft 44, carrying an intermediate gear-wheel D, having anti-friction rollers 45 in its hub, as shown in Fig. 4. This forwardly-extending bar 42 terminates in a bearing 46, and on the opposite side of the machine-body and in axial line with the bearing 46 there is a similar bearing 47, in which bearings there is journaled a shaft 48, rotated by a pinion E, meshing with the intermediate gear wheel D, which latter gear wheel is engaged by the spur gear wheel C, as clearly shown in several of the figures. The shaft 48 crosses the machine-body and upon it are mounted a series of beater-arms F, the object of which is to break up, in conjunction with a series of breaker-bars 49, limbs and branches of cotton plants that enter the machine-body. Again referring to the member B shown in Fig. 7, this member has a downwardly-projecting part 50, having a bearing 51 at its end, and on the opposite side of the machine-body, and in line with this bearing, there is a further bearing 52, Fig. 6, in which bearings is journaled a shaft 53, on which there are secured a series of circular disks G, having in their periphery teeth, similar to the teeth employed on the saws used in cotton gins, said shaft 53 being rotated by a pinion J, meshing with the spur gear-wheel C.

The brackets 26 are formed, preferably integral, with bearings 54, in which is journaled a shaft 55, carrying a fluted roller 56, the leaves of which serve as a crusher or disintegrator in conjunction with the circular saw-disks G.

Upon the upper horizontal angle bars 13, 14, and near their rear ends, are located bearings 56', in which is journaled a shaft 57, on which there is mounted a rotating fan H, the wings or blades 58 of which are provided with radially-projecting brushes 59. This fan is contained in a casing H', having a rearwardly-projecting downwardly-turned discharge spout H'', through which the cotton lint is conducted to the basket 22, and an entrance-opening 60, into which the saws G project to be engaged at their peripheries by the brushes 59 in the fan-blades 58. The blower-fan H is rotated from the beater shaft 48 by a sprocket wheel 61, located at the outer end of said shaft and a drive chain 63, leading to a sprocket wheel 62, on the fan-shaft 57.

In order to lead the branches and limbs of cotton plants into the machine-body to be stripped of the loose cotton and the bolls thereon, there is located in front of said machine-body an inclined gatherer I, comprising two members I', I'', shown in detail in Figs. 11 to 15 inclusive. These members I', I'', have at their upper ends hangers 64, 64ª, which engage with clamping hubs 65 the beater shaft 48, whereby said beater shaft is made the fulcrum for the inclined members I', I''. These members are spaced apart and are connected at their upper ends to a curved guard 66, upon which the breaker bars 49 are located, and they have at their forward ends curved entrance-enlargements 67 to guide the trunks of cotton plants into the space 67ª between the members I', I''.

Figures 11, 12, 13, 14, 15:
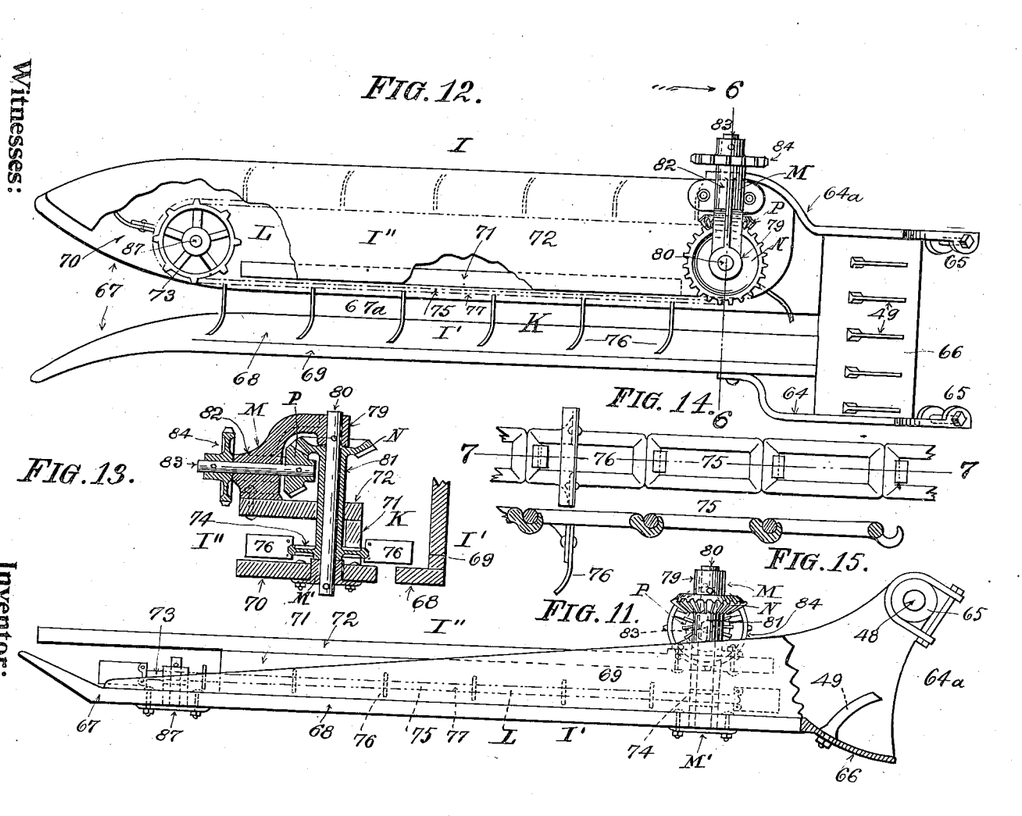
Fig. 11 is a side elevation of the gathering mechanism located at the forward part of the machine-body, said figure being drawn on a larger scale on line 5, 5, of Fig. 2.
Fig. 12 is a plan of the same.
Fig. 13 is a sectional elevation of the conveyer-operating mechanism, drawn on line 6, 6, of Fig. 12.
Fig. 14 is an elevation of a portion of the conveyer link-belt.
Fig. 15 is a sectional view on line 7, 7, of Fig. 14.

The inclined member I' comprises, as illustrated in Fig. 13, a bottom member 68, and a side member 69, while the inclined member I'' includes a bottom member 70, an inner side member 71, and a top board 72, whereby the parts 68, 69, 70, and 71, form on the inclined gatherer a channel K, within which the limbs and branches of cotton plants are confined in their ascent upon said inclined gatherer. On the inclined member I'' there is located a conveyer L, comprising a sprocket wheel 73, located near the lower end of said member 70, and a further sprocket wheel 74, located near the upper end thereof, said sprocket wheels being connected by a conveyer link belt 75, a series of the links of which are provided with paddles 76 at predetermined intervals. The run 77 of the conveyer belt 75 is in front of the wall 71 and in the channel K, the paddles 76 reaching approximately across the said channel and the passage 67ª, but the opposite run of said belt is behind this wall 71 and is covered by the board 72, so that limbs and branches of the cotton plants cannot reach that portion of the conveyer belt located underneath said board 72. This conveyer is operated by driving mechanism including the following elements:

A standard M, is located upon the cover board 72 near its upper end, and it has an upwardly projecting arm terminating in a bearing 79, in which a shaft 80, is secured. To the bottom member 70 there is fastened a further bearing M', in axial line with the bearing 79, in which bearings the shaft 80 is fastened so that it will not revolve. On this shaft 80 rotates a bevel wheel N, which connects with the sprocket wheel 74 by a sleeve 81. In the standard M there is also a horizontal bearing 82, in which is journaled a shaft 83, which carries at its inner end a bevel pinion P, meshing with the bevel wheel N, and which carries at its outer end a sprocket wheel 84.

On the outer end of the beater shaft 48, next to the sprocket wheel 61, there is fastened a further sprocket wheel 85, connected to the sprocket wheel 84 by a link belt 86. The lower sprocket wheel on the conveyer mechanism is mounted upon a shaft 87 fastened in a plate secured to the lower side of the inclined member I''.

Figure 2:
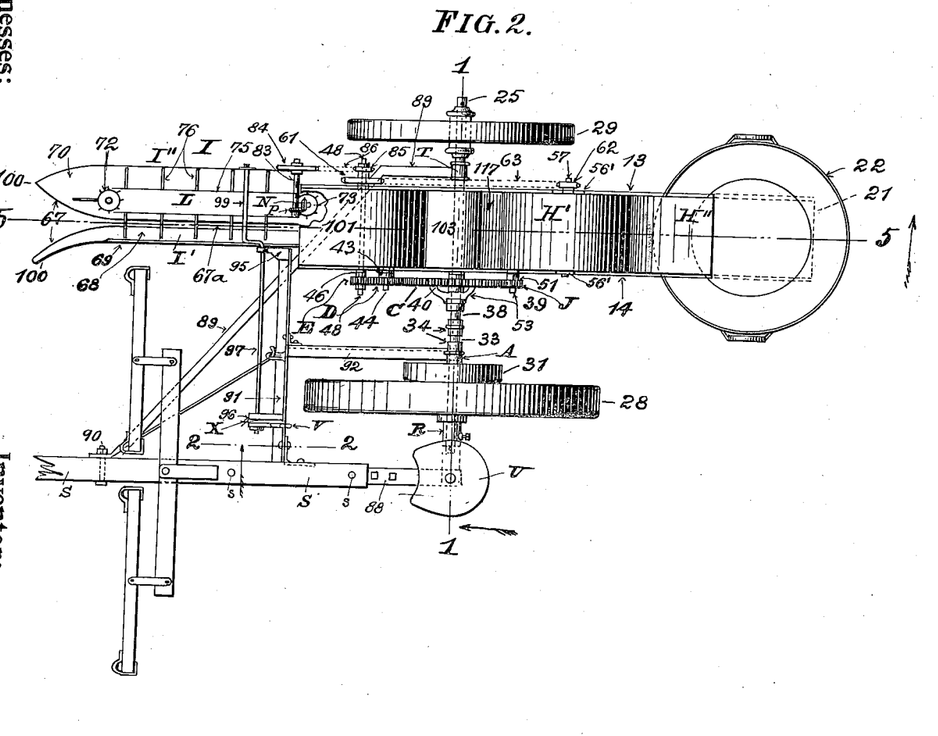
Fig. 2 is a plan of the same, the cover-board on one of the inclined gatherers being removed to disclose underlying mechanism.

The running gear of this vehicle includes, in addition to the axle 25 and the wheels 28 and 29, a downwardly pending arm R, fastened to the axle 25 at its outer end and in front of the traction wheel 28. To this arm there is secured an angle bar 88, to which a vehicle pole S, is fastened by bolts s, s, said pole being provided with the usual swingle and double trees shown in Fig. 2, and to which a team of draft animals is hitched in the usual manner. Upon the axle 25, near the grain wheel 29 there is a further, downwardly pending, arm T, to which an angle bar 89, is secured, which angle bar reaches forward and then diagonally across and below the machine-body and terminates at the pole S, to which it is secured by bolts 90. To the angle bar 88 and at right angles thereto, is secured a further angle bar 91, which connects with the vertical angle bars 15, 16, and in about its middle this angle bar 91 is connected, by an angle bar 92, to the arm 35 of the bracket A. By this construction and combination of the various angle bars, arms, and brackets, I have produced a very strong and rigid gear, which I find necessary owing to the fact that the propelling power of the machine is applied at the side of the machine-body to enable a team to move between adjacent rows of cotton plants. This team is guided, and the machine governed, by an attendant seated upon a seat U, located upon a spring bar 93, fastened to the angle bar 88, as clearly shown in Figs. 1 and 3.

Figure 10:
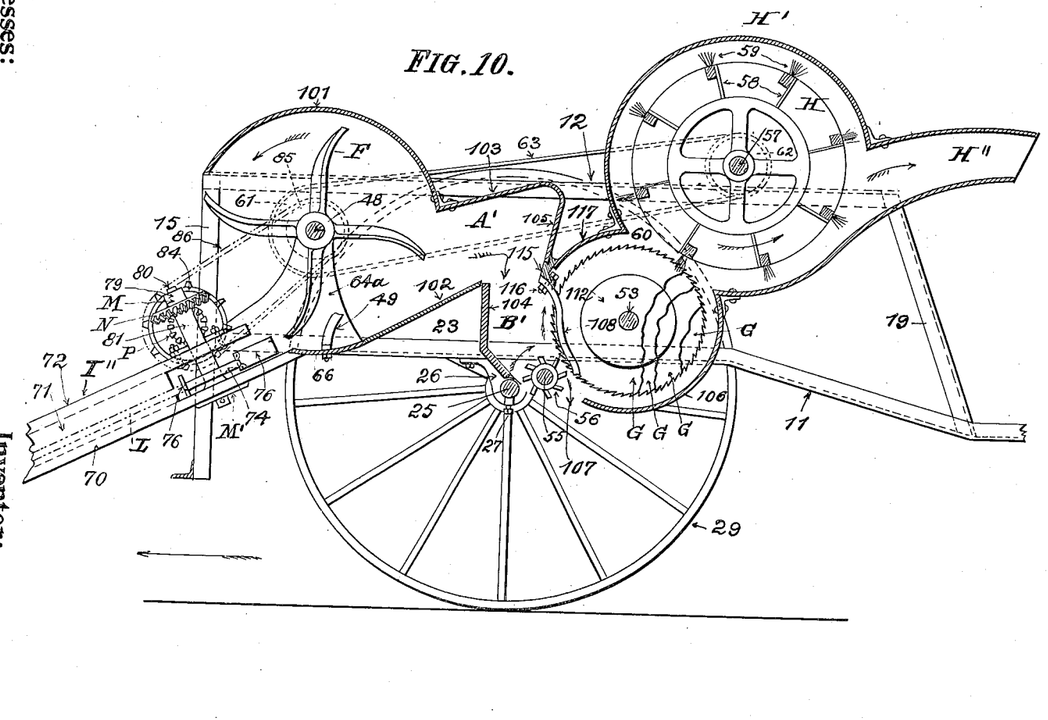
Fig. 10 is a longitudinal sectional elevation, on line 5, 5, of Fig. 2 looking in the direction of the arrow shown thereon.

The inclined gatherers I', I'', are adapted to be raised and lowered at their forward end by mechanism including the following parts: Upon the angle bar 91 there are located in spaced relation to each other, two brackets 95, 96, in which there is journaled a rock shaft 97, to one end of which, and within convenient reach of the attendant seated upon the seat U, there is a hand lever V, by which the shaft 97 is adapted to be rocked. The bracket 95 is formed, preferably integral, with a notched quadrant X, wherewith a catch 78, on the hand lever V, and operated by the hand-piece 98 thereon, engages to lock the hand lever V, and with it the rock shaft 97 in any desired position, in the usual manner. This rock shaft 97 is cranked at 99, and this end of the rock shaft is connected to the inclined gatherer members I', I'', in any convenient manner. It will now be observed that by properly manipulating the hand lever V, the inclined members I', I'', may be raised and lowered at their front ends to follow the undulations of the ground over which the machine is being moved, or to pass over obstructions in the field, and for other obvious purposes. In operation, these inclined members I', I", are lowered so that their forward ends 100, are in close proximity to the ground adjacent to the cotton plants, to lift lower branches and limbs thereof upon the inclined gatherer. These branches and limbs move gradually upward on the gatherer members and pass through the space 67$^a$ which is, however, so narrow that cotton bolls and some of the heavier limbs and branches cannot pass therethrough but are torn or severed from the trunks and moved upward upon the inclined members until they reach the beater arms F which then take hold of these plant-portions and force them through the spaces between the breaker bars 49, but breaking them up into smaller parts. In their movement upon the inclined gatherer, the limbs and branches, and such loose cotton lint as is within reach of the inclined gatherer, are assisted in ascending by the paddles 76 on the conveyer link belt set forth. This forward movement of the machine causes the rotation and movements of all the mechanisms described, as follows: The traction wheel and the clutch thereon rotates the internal gear wheel 31, and this, in turn, rotates the pinion 32 and shaft 33. The clutch 39 rotates the spur gear C, and this gear revolves the intermediate gear D and the latter the gear E on the beater shaft 48, and by the sprocket wheel 85, link belt 86, and sprocket wheel 84, the conveying mechanism. At the same time the spur gear wheel C also rotates the pinion J and its shaft 53 with the series of circular saw disks G, while the pinion J', also engaged by the spur gear C, rotates the crusher or disintegrator. And finally the sprocket wheel 61 on the beater shaft 48 rotates the fan blower H through the link belt 63 and the sprocket 62 on the fan shaft 57, the direction of rotation of the various revolving parts in the machine-body being indicated by arrows in Fig. 10.

Figures 16, 17, 18:
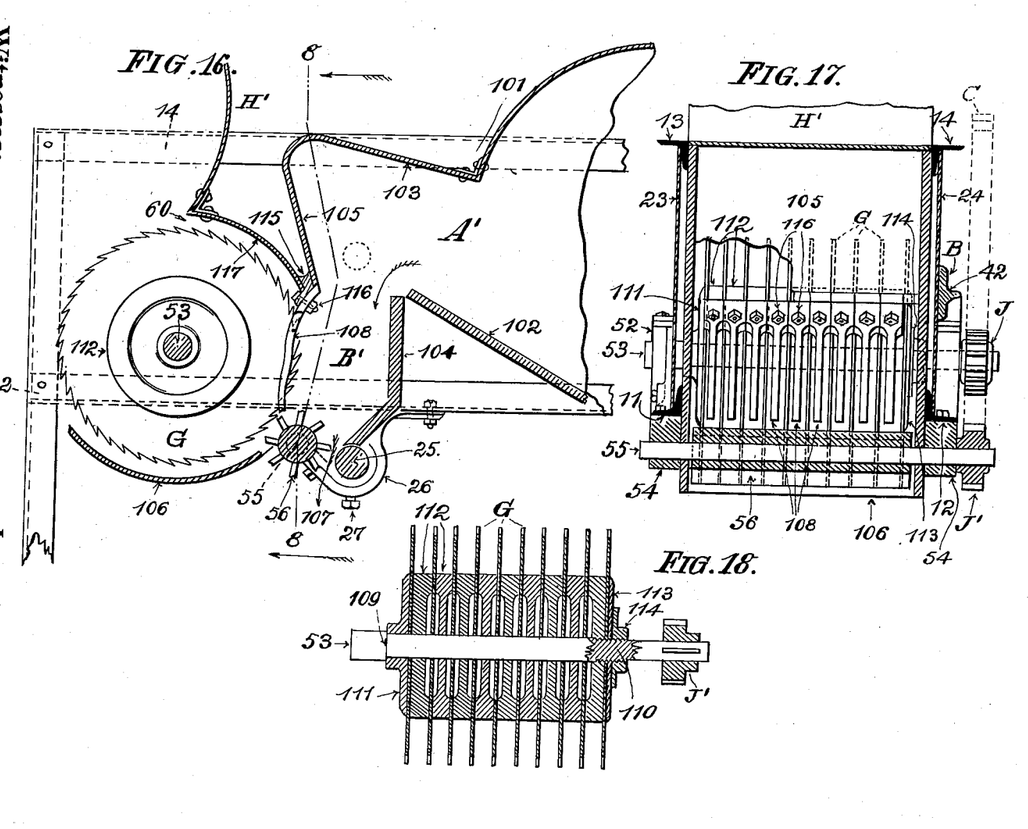
Fig. 16 is a longitudinal sectional elevation of the central portion of this machine.
Fig. 17 is a transverse sectional view on line 8, 8, of Fig. 16.
Fig. 18 is a sectional view of the lint-separating disks detached.

The fan blower establishes a current of air through the passage A' in the machine-body, the air entering at the forward end of the same, which is open, and then passes through the passage A' formed by a cover 101, over the beaters; two inclined transverse walls 102, and 103; two approximately vertical walls 104, 105, and a partial casing 106 surrounding the lower portion of the saws G, and a similar portion 117, covering the upper portion thereof, and the cover H' of the fan casing, and escapes from the discharge spout H". This air current will cause the cotton lint, bolls, broken limbs and other trash to be drawn through the passage A' into a vertical chamber B', below which the crusher 56 is located. This crusher disintegrates, in conjunction with the rotating circular saws G, all parts of the trash, which drop out of the chamber B' through a bottom opening 107 therein, while the cotton lint, separated from the trash, is taken up by the saw teeth, then separated therefrom by the brushes on the fan blades, and carried by the air current through the spout H" into the receptacle 22. These circular saws are mounted upon the shaft 53 already mentioned, said shaft having a shouldered part 109, near one end, and an externally screw-threaded part 110, near its other end. On the shouldered part 109 there is a disk 111, and adjacent to this disk are alternately arranged the saw disks G and a separating disk 112, between each saw, the series terminating in a clamping disk 113, and a tightening nut 114, by which the parts upon said shaft are rigidly secured. And in order that no trash may be carried along with the cotton lint, there are placed between each saw disk G, a curved bar, 108, constituting a guard, as clearly shown in Figs. 10, 16, and 17, which curved bars are bolted by bolts 116, to a cross-piece 115, to which are also secured the slightly inclined wall 105, and the portion 117 of the cover for the saws.

To prevent the lint escaping from the spout H" from scattering, a canvas skirt, not shown, is removably secured to the discharge spout and caused to encircle the upper portion of the receptacle 22.

Having thus fully described this invention, I claim as new and desire to secure to me by Letters Patent of the United States—

1. A cotton harvester, comprising, in combination, a machine body mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body the forward end of which is in close proximity to the ground over which the machine is moving to lift lower branches of cotton plants upon said inclined gatherer, said inclined gatherer comprising two separate members spaced apart to permit stalks, branches and limbs of said plants to enter, and to pass through, said space between said members but to intercept bolls and larger limbs, said inclined members being adapted to conduct plant portions into said passage; a beater in said machine body adapted to break up cotton plant portions admitted to said passage; a crusher in said exit passage including a cylinder having a series of longitudinally disposed, radially projecting knives, said cylinder approximately closing the said exit opening, said knives being adapted to disintegrate plant portions in said passage; and to separate said disintegrated plant portions from cotton lint adhering thereto; means adapted to conduct said separated lint out of said passage; a receptacle adapted to receive said separated cotton lint; means for operating said beater; means for operating said crusher, and lint separator, and means for operating said lint conducting means.

2. A cotton harvester, comprising, in combination, a machine body mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body the forward end of which is in close proximity to the ground over which the machine is moving to lift lower branches of cotton plants upon said inclined gatherer, said inclined gatherer comprising two separate members spaced apart to permit stalks, branches, and limbs of said plants to pass through said space between said members but to intercept bolls and larger limbs, said inclined members being adapted to conduct plant portions into said passage; a beater in said machine body adapted to break up cotton plant portions admitted to said passage; a crusher in said exit passage including a cylinder having a series of longitudinally disposed, radially projecting knives, said cylinder approximately closing the said exit opening, said knives being adapted to disintegrate plant portions in said passage; and to separate said disintegrated plant portions from cotton lint adhering thereto; means adapted to conduct said separated lint out of said passage, the latter means including pneumatically operating devices; a receptacle adapted to receive said separated cotton lint; means for operating said beater; means for operating said crusher; and lint separator, and means for operating said lint conducting means.

3. A cotton harvester, comprising a machine body, mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body the forward end of which is in close proximity to the ground over which said machine body moves to lift lower branches of cotton plants upon said inclined gatherer, said inclined gatherer comprising two separate members spaced apart to permit stalks, branches and limbs of cotton plants to enter, and pass through the space between said members but to intercept bolls and larger limbs; a conveyer on one of said inclined members adapted to assist cotton plant portions in ascending said inclined gatherer; said conveyer having wings crossing the space between the gatherer members, a crusher in said exit passage including a cylinder having a series of longitudinally disposed, radially projecting knives, said cylinder approximately closing the exit opening, said knives being adapted to disintegrate cotton plant portions in said passage; and to separate cotton plant portions from cotton lint adhering thereto; means adapted to conduct said separated cotton lint out of said passage; a receptacle adapted to receive said separated cotton lint; means for operating said conveyer; means for operating said crusher; and lint separator, and means for operating said lint conducting means.

4. A cotton harvester, comprising, in combination, a machine body mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body the forward end of which is in close proximity to the ground over which said machine body moves to lift lower branches of cotton plants upon said inclined gatherer, said inclined gatherer comprising two separate members spaced apart to permit stalks, branches and limbs of cotton plants to enter, and pass through, the space between said members but to intercept bolls and larger limbs; a conveyer on one of said inclined members adapted to assist cotton plant portions in ascending said inclined gatherer; said conveyer having wings crossing the space between the gatherer members, a crusher in said exit passage including a cylinder having a series of longitudinally disposed, radially projecting knives, said cylinder approximately closing the said exit opening, said knives being adapted to disintegrate cotton plant portions in said passage; and to separate cotton plant portions from cotton lint adhering thereto; means adapted to conduct said separated cotton lint out of said passage, the latter means including pneumatically operating devices; a receptacle adapted to receive said separated cotton lint; means for operating said conveyer; means for operating said crusher; and lint separator, and means for operating said lint conducting means.

5. A cotton harvester, comprising, in combination, a machine body mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body the forward end of which is in close proximity to the ground over which said machine body moves to lift lower branches of cotton plants upon said inclined gatherer, said inclined gatherer comprising two separate members spaced apart to permit stalks; branches and limbs of cotton plants to enter, and pass through, the space between said members but to intercept bolls and larger limbs; a conveyer on one of said inclined members adapted to assist cotton plant portions in ascending said inclined gatherer; said conveyer having wings crossing the space between the gatherer members, a beater in said machine body adapted to break up cotton plant portions admitted to said passage; a crusher in said exit passage including a cylinder having a series of longitudinally disposed, radially projecting knives, said cylinder approximately closing the said exit opening, said knives being adapted to disintegrate cotton plant portions in said passage; and to separate cotton plant portions from cotton lint adhering thereto; means adapted to conduct said separated cotton lint out of said passage; a receptacle adapted to receive said separated cotton lint; means for operating said conveyer; means for operating said beater; means for operating said crusher; and lint separator, and means for operating said lint conducting means.

6. A cotton harvester, comprising, in combination, a machine body mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body the forward end of which is in close proximity to the ground over which said machine body moves to lift lower branches of cotton plants upon said inclined gatherer; said inclined gatherer comprising two separate members spaced apart to permit stalks, branches and limbs of cotton plants to enter, and pass through, the space between said members but to intercept bolls and larger limbs; a conveyer on one of said inclined members adapted to assist cotton plant portions in ascending said inclined gatherer; said conveyer having wings crossing the space between the gatherer members, a beater in said machine body adapted to break up cotton plant portions admitted to said passage; a crusher in said exit passage including a cylinder having a series of longitudinally disposed, radially projecting knives, said cylinder approximately closing the said exit opening, said knives being adapted to disintegrate cotton plant portions in said passage; and to separate cotton plant portions from cotton lint adhering thereto; means adapted to conduct said separated cotton lint out of said passage, the latter means including pneumatically operating devices; a receptacle adapted to receive said separated cotton lint; means for operating said conveyer; means for operating said beater; means for operating said crusher; and lint separator, and means for operating said lint conducting means.

7. A cotton harvester, comprising, in combination, a machine body mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body, said inclined gatherer being pivoted in said machine body at its rear end, its forward end being in close proximity to the ground over which the machine is moving to lift lower branches of cotton plants upon said inclined gatherer; means adapted to raise and lower the said inclined gatherer at its forward end to follow the undulations of the ground at its forward end; a beater in said machine body adapted to break up cotton plant portions admitted to said passage; a crusher in said exit passage including a cylinder having a series of longitudinally disposed, radially projecting knives, said cylinder approximately closing the said exit opening, said knives being adapted to disintegrate cotton plant portions in said passage; and to separate cotton plant portions from cotton lint adhering thereto; means adapted to convey said separated lint out of said passage; a receptacle adapted to receive said separated cotton lint; means for operating said beater; means for operating said crusher; and lint separator, and means for operating said lint conducting means.

8. A cotton harvester, comprising, in combination, a machine body mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body, said inclined gatherer being pivoted in said machine body at its rear end, its forward end being in close proximity to the ground over which the machine is moving to lift lower branches of cotton plants upon said inclined gatherer; means adapted to raise and lower said inclined gatherer at its forward end to follow the undulations of the ground at its forward end; a beater in said machine body adapted to break up cotton plant portions admitted to said passage; a crusher in said exit passage including a cylinder having a series of longitudinally disposed, radially projecting knives, said cylinder approximately closing the said exit opening, said knives being adapted to disintegrate cotton plant portions in said passage; and to separate cotton plant portions from cotton lint adhering thereto; means adapted to conduct said separated lint out of said passage, the latter means including pneumatically operating devices; a receptacle adapted to receive said separated cotton lint; means for operating said beater; means for operating said crusher; and lint separator, and means for operating the lint conducting means.

9. A cotton harvester, comprising, in combination, a machine body mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body the forward end of which is in close proximity to the ground over which the machine is moving to lift lower branches of said plants upon said inclined gatherer, said gatherer including two separate members spaced apart to permit stalks, branches and limbs of cotton plants to enter and pass through the space between said members but to intercept bolls and larger limbs; a channel in said gatherer in which cotton plant portions are adapted to be confined while ascending said inclined gatherer to enter said passage; a beater in said machine body adapted to break up cotton plant portions admitted to said passage; a crusher in said exit passage including a cylinder having a series of longitudinally disposed, radially projecting knives, said cylinder approximately closing the said exit opening, said knives being adapted to disintegrate cotton plant portions in said passage; and to separate cotton plant portions from cotton lint adhering thereto; means adapted to conduct said separated lint out of said passage; a receptacle adapted to receive said separated cotton lint; means for operating said beater; means for operating said crusher; and lint separator, and means for operating said lint conducting means.

10. A cotton harvester, comprising, in combination, a machine body mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body the forward end of which is in close proximity to the ground over which the machine is moving to lift lower branches of said plants upon said inclined gatherer, said gatherer including two separate members spaced apart to permit stalks, branches and limbs of cotton plants to enter and pass through the space between said members but to intercept bolls and larger limbs; a channel in said gatherer in which cotton plant portions are adapted to be confined while ascending said inclined gatherer to enter said passage; a beater in said machine body adapted to break up cotton plant portions admitted to said passage; a crusher in said exit passage including a cylinder having a series of longitudinally disposed, radially projecting knives, said cylinder approximately closing the said exit opening, said knives being adapted to disintegrate cotton plant portions in said passage; and to separate cotton plant portions from cotton lint adhering thereto; means adapted to conduct said separated lint out of said passage, the latter means including pneumatically operating devices; a receptacle adapted to receive said separated cotton lint; means for operating said beater; means for operating said crusher, and lint separator, and means for operating said lint conducting means.

11. A cotton harvester, comprising, in combination, a machine body mounted on wheels; a passage having a downwardly leading part in said machine body adapted to receive cotton plant portions from which cotton lint is adapted to be removed; a chamber at the downwardly-leading part of said passage; an exit opening in the lower part of said chamber; an inclined gatherer in front of said machine body, said inclined gatherer being pivoted at its rear end in said machine body, its forward end being in close proximity to the ground over which the machine is moving to lift lower branches of said plants upon said inclined gatherer; means adapted to raise and lower said inclined gatherer at its forward end to follow the undulations of the ground at this forward end; a channel in said inclined gatherer in which cotton plant portions are adapted to be confined while ascending said inclined gatherer; a beater in said machine body adapted to break up cotton plant portions entering said passage; a crusher in said exit passage including a cylinder having a series of longitudinally disposed, radially projecting knives, said cylinder approximately closing the said exit opening, said knives being adapted to disintegrate cotton plant portions in said passage; and to separate cotton plant portions from cotton lint adhering thereto; means adapted to conduct said separated lint out of said passage; a receptacle adapted to receive said separated cotton lint; means for operating said beater; means for operating said crusher; and lint separator, and means for operating said lint conducting means.

12. A cotton harvester, comprising, in combination, a machine body mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body, said inclined gatherer being pivoted at its rear end in said machine body, its forward end being in close proximity to the ground over which the machine is moving to lift lower branches of said plants upon said inclined gatherer; means adapted to raise and lower said inclined gatherer at its forward end to follow the undulations of the ground at this forward end; a channel in said inclined gatherer in which cotton plant portions are adapted to be confined while ascending said inclined gatherer; a beater in said machine body adapted to break up cotton plant portions entering said passage; a crusher in said exit passage including a cylinder having a series of longitudinally disposed, radially projecting knives, said cylinder approximately closing the said exit opening, said knives being adapted to disintegrate cotton plant portions in said passage; and to separate cotton plant portions from cotton lint adhering thereto; means adapted to conduct said separated cotton lint out of said passage, the latter means including pneumatically operating devices; a receptacle adapted to receive said separated lint; means for operating said beater; means for operating said crusher, and lint separator, and means for operating said lint conducting means.

13. A cotton harvester, comprising, in combination, a machine body mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body, said gatherer being pivoted at its rear end in said machine body, its forward end being in close proximity to the ground over which the machine is moving to lift lower branches of said plants upon said inclined gatherer; means on said machine body adapted to raise and lower the forward end of said gatherer to follow the undulations of the ground at this forward end; a channel in said inclined gatherer wherein cotton plant portions are adapted to be confined while ascending said inclined gatherer to enter said passage, said inclined gatherer comprising two separate members spaced apart to permit trunks and limbs of said plants to enter and pass through the space between said members but to intercept bolls and larger limbs of said plants; a conveyer on said inclined gatherer adapted to assist said cotton plant portions in ascending said channel; said conveyer having wings crossing the space between the gatherer members, a crusher in said exit passage including a cylinder having a series of longitudinally disposed, radially projecting knives, said cylinder approximately closing the said exit opening, said knives being adapted to disintegrate cotton plant portions admitted to said passage; and to separate cotton plant portions from cotton lint adhering thereto; means adapted to conduct said separated cotton lint out of said passage; a receptacle adapted to receive said separated cotton lint; means for operating said conveyer; means for operating said crusher; and lint separator, and means for operating said lint conducting means.

14. A cotton harvester, comprising, in combination, a machine body mounted on wheels; a passage having a downwardly leading part in said machine body adapted to receive cotton plant portions from which cotton lint is adapted to be removed; a chamber at the downwardly-leading part of said passage; an exit opening in the lower part of said chamber; an inclined gatherer in front of said machine body, said gatherer being pivoted at its rear end in said machine body, its forward end being in close proximity to the ground over which the machine is moving to lift lower branches of said plants upon said inclined gatherer; means on said machine body adapted to raise and lower the forward end of said gatherer to follow the undulations of the ground at this forward end; a channel in said inclined gatherer wherein cotton plant portions are adapted to be confined while ascending said inclined gatherer to enter said passage, said inclined gatherer comprising two separate members spaced apart to permit trunks and limbs of said plants to enter and pass through the space between said members but to intercept bolls and larger branches of said plants; a conveyer on said inclined gatherer adapted to assist said cotton plant portions in ascending said channel; said conveyer having wings crossing the space between the gatherer members, a crusher in said exit passage including a cylinder having a series of longitudinally disposed, radially projecting knives, said cylinder approximately closing the said exit opening, said knives being adapted to disintegrate cotton plant portions admitted to said passage; and to separate cotton plant portions from cotton lint adhering thereto; means adapted to conduct said separated cotton lint out of said passage, the latter means including pneumatically operating devices; a receptacle adapted to receive said separated cotton lint; means for operating said conveyer; means for operating said crusher; and lint separator, and means for operating said lint conducting means.

15. A cotton harvester, comprising, in combination, a machine body mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body, said gatherer being pivoted at its rear end in said machine body, its forward end being in close proximity to the ground over which the machine is moving to lift lower branches of said plants upon said inclined gatherer; means on said machine body adapted to raise and lower the forward end of said gatherer to follow the undulations of the ground at this forward end; a channel in said inclined gatherer wherein cotton plant portions are adapted to be confined while ascending said inclined gatherer to enter said passage, said inclined gatherer comprising two separate members spaced apart to permit trunks and limbs of said plants to enter and pass through the space between said members but to intercept bolls and larger branches of said plants; a conveyer on said inclined gatherer adapted to assist said cotton plant portion is ascending said channel; said conveyer having wings crossing the space between the gatherer members, a beater in said machine body adapted to break up cotton plant portions entering said passage; a crusher in said exit passage including a cylinder having a series of longitudinally disposed, radially projecting knives, said cylinder approximately closing the said exit opening, said knives being adapted to disintegrate cotton plant portions in said passage; and to separate cotton plant portions from cotton lint adhering thereto; means adapted to conduct said separated cotton lint out of said passage; a receptacle adapted to receive said separated cotton lint; means for operating said conveyer; means for operating said crusher; means for operating said beater; and lint separator, and means for operating said lint conducting means.

16. A cotton harvester, comprising, in combination, a machine body mounted on wheels; a passage having a downwardly-leading part in said machine body adapted to receive cotton plant portions from which cotton lint is adapted to be removed; a chamber at the downwardly-leading part of said passage; an exit opening in the lower part of said chamber; an inclined gatherer in front of said machine body, said gatherer being pivoted at its rear end in said machine body, its forward end being in close proximity to the ground over which the machine is moving to lift lower branches of said plants upon said inclined gatherer; means on said machine body adapted to raise and lower the forward end of said gatherer to follow the undulations of the ground at this forward end; a channel in said inclined gatherer wherein cotton plant portions are adapted to be confined while ascending said inclined gatherer to enter said passage; said inclined gatherer comprising two separate members spaced apart to permit trunks and limbs of said plants to enter and pass through the space between said members but to intercept bolls and larger branches of said plants; a conveyer on said inclined gatherer adapted to assist said cotton plant portions in ascending said channel; said conveyer having wings crossing the space between the gatherer members, a beater in said machine body adapted to break up cotton plant portions entering said passage; a crusher in said exit passage including a cylinder having a series of longitudinally disposed, radially projecting knives, said cylinder approximately closing the said exit opening, said knives being adapted to disintegrate cotton plant portions in said passage; and to separate cotton plant portions from cotton lint adhering thereto; means adapted to conduct said separated cotton lint out of said passage; the latter means including pneumatically operated devices; a receptacle adapted to receive said separated cotton lint; means for operating said conveyer; means for operating said crusher; and lint separator, and means for operating said lint conducting means.

In testimony that I claim the foregoing as my invention, I have hereunto set my hand in the presence of two subscribing witnesses.

ORLEY C. HOUGHTON.

Witnesses:
JAMES J. TYNAN,
IRVING W. FISHER.